Patented June 17, 1941

2,245,962

UNITED STATES PATENT OFFICE 2,245,962

REACTION OF VINYLIDENE DIHALIDES WITH ALCOHOLATES

Gerald H. Coleman, Ralph M. Wiley, and Bartholdt C. Hadler, Midland, Mich., assignors to The Dow Chemical Company, Midland, Mich., a corporation of Michigan No Drawing. Application January 14, 1939, Serial No. 250,972

17 Claims. (Cl. 260—493)

This invention relates to the reaction of vinylidene dihalides with alcoholates and to certain new compounds prepared by such reaction.

We have discovered that vinylidene dihalides may be reacted with metal alcoholates of monohydric alcohols to form a number of useful products. Depending upon the particular operating conditions chosen, the major product of the reaction may be an ester of acetic acid or one of a class of new 1.1-dialkoxy ethyl halides having the general formula:

(1) $\qquad CH_3—CX(OR)_2$ wherein X is a halogen and OR is the residue of a monohydric alcohol. These latter new compounds are useful as intermediates in the synthesis of various types of complex organic compounds.

The reactions according to the invention may be represented by the following equations, in which X represents a halogen, M a metal, and OR the residue of a monohydric alcohol:

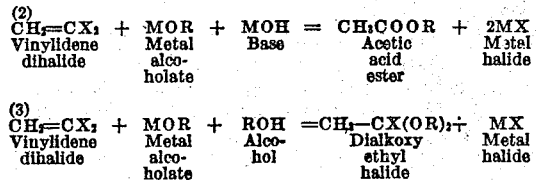

The metal alcoholate may be added as such to the reaction mixture, or it may be formed therein by interaction of an alcohol and a metal or a basic compound of a metal. In the latter instance, the Reactions 2 and 3 may be formulated as:

(4) $CH_2=CX_2+ROH+2MOH=$
$\qquad CH_3COOR+2MX+H_2O$
(5) $CH_2=CX_2+2ROH+MOH=$
$\qquad CH_3—CX(OR)_2+MX+H_2O$ The reaction of vinylidene dihalides and metal alcoholates according to the invention may be conducted in the absence of a solvent or in any suitable inert anhydrous medium, e. g. benzene. Alternatively, we may operate in an aqueous medium and form the metal alcoholate in situ by interaction of the desired alcohol and a basic compound of a metal. According to a preferred procedure, the vinylidene dihalide, alcohol, and basic compound of a metal are mixed in the desired proportions and maintained at a reaction temperature e. g. 20°–175° C., until reaction is substantially complete, usually in 0.2–10.0 hours. The products are then separated and purified by fractional distillation or other suitable means.

As will be evident from Equations 2–5, when the vinylidene dihalide and metal alcoholate are reacted in the presence of an excess of a base, an alkyl acetate is the principal product, but when the reaction takes place in the presence of excess alcohol, the formation of dialkoxy ethyl halide predominates. The proportion of alkyl acetate and dialkoxy ethyl halide in the reaction product is also dependent upon the temperature of the reaction. At moderate temperatures, e. g. 20°–70° C., alkyl acetate is the principal product whereas at more elevated temperatures, e. g. 75°–175° C., particularly when superatmospheric pressures are employed, the yield of dialkoxy ethyl halide is markedly increased. Accordingly, in the reaction of vinylidene dihalides with alcoholates, it is possible, by adjusting the relative proportion of basic agent or alcohol in the reaction mixture, and by suitably controlling the reaction temperature, to obtain as the major reaction product either an acetic acid ester, dialkoxy ethyl halide, or a mixture of these products, as may be most economical.

In so far as we are aware, any vinylidene dihalide, e. g. vinylidene dichloride, vinylidene dibromide, vinylidene chloro-bromide, etc., may be reacted according to the invention with the metal alcoholate of any monohydric alcohol. For example, the metal salts particularly of aliphatic monohydric primary and secondary alcohols such as methanol, ethanol, n-propanol, isopropanol, n-butanol, secondary-butanol, n-octanol, lauryl alcohol, stearyl alcohol and allyl alcohol may be reacted with vinylidene dihalides, preferably vinylidene dichloride, in our process to form alkyl acetates and dialkoxy ethyl halides having the generic Formula 1. However, the metal salts of aliphatic tertiary alcohols such as tertiary butanol, of cycloaliphatic alcohols such as cyclohexanol and of aralkyl alcohols such as benzyl alcohol and phenyl ethyl alcohol, etc., may also be employed. Any suitable metal or basic compound of a metal may be employed in forming the metal alcoholate reactant, according to known procedures. Thus we may use the oxides and hydroxides of the alkali and alkaline earth metals, e. g. sodium hydroxide, potassium oxide, etc., or metals such as sodium and calcium.

The following examples are illustrative of our invention but are not to be construed as limiting its scope.

Example 1

A solution of potassium ethylate was prepared by dissolving 100 grams (1.79 mols) of potassium hydroxide in a mixture of 400 c. c. of ethyl alcohol and 70 c. c. of water. The entire solution was placed in a flask under a reflux condenser and 100 grams (1.03 mols) of vinylidene dichloride was added with agitation. A rapid reaction accompanied by considerable evolution of heat occurred, and after 20 minutes the reaction mixture began to boil slowly. Agitation was continued until ebullition ceased, after which the mixture was fractionally distilled to separate the products of the reaction. In this way 45 grams (0.52 mol) of ethyl acetate, boiling point 77° C., specific gravity 0.905, was recovered, a quantity corresponding to a yield of 51 per cent based on the vinylidene dichloride employed.

Example 2

A mixture of 2.5 mols of vinylidene dichloride, 10.0 mols of n-propanol, and 5.0 mols of sodium hydroxide was allowed to stand at room temperature for 12 hours and was then heated for 5 hours in a closed stainless steel reactor at a temperature of about 150° C. and at a pressure of 150 pounds per square inch. The reactor was then cooled, opened, and the contents washed out with water. The aqueous reaction liquor so obtained was repeatedly extracted with benzene and the extracts combined. The remaining aqueous layer was found to contain 4.05 mols of sodium chloride showing that 81 per cent of the chlorine present in the vinylidene dichloride had reacted. The benzene extract was then fractionally distilled at reduced pressure to remove the benzene and to separate the reaction products. In this way there was recovered 0.21 mol of n-propyl acetate and 0.50 mol of 1,1-di-n-propoxy ethyl chloride,

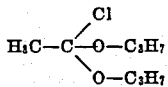

a clear oily liquid having a boiling point of 87°–88° C. at 20 millimeters of mercury absolute pressure, a specific gravity of 0.97, and a refractive index $$n_D^{20}$$

of 1.424. Other substances identified in the crude reaction product included small quantities of sodium acetate, di-n-propyl ether, and 1,1-di-n-propoxy ethanol.

Example 3

A solution of sodium n-propylate was prepared by dissolving 1.0 mol of metallic sodium in a mixture of 2.0 mols of n-propanol and 1.1 mol of benzene. This solution was heated with 0.5 mol of vinylidene dichloride in a closed copper reactor at a temperature of 150° C. for 5 hours. The crude reaction product was then removed, extracted, and fractionally distilled as in Example 2. n-Propyl acetate and 1,1-di-n-propoxy ethyl chloride were recovered.

Example 4

A mixture of 2.0 mols of vinylidene dichloride, 4.0 mols of n-butanol, and 4.0 mols of sodium hydroxide was heated for 10 hours in a closed stainless steel reactor at a temperature 90° to 110° C. at a pressure of 55 pounds per square inch. The reaction product was removed with water and worked up as in Example 2. n-Butyl acetate and 1,1-di-n-butoxy ethyl chloride,

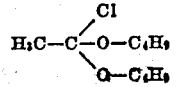

a clear oily liquid having a boiling point of 83°–85° C. at 5 millimeters absolute pressure, a specific gravity of 0.954 and a refractive index $$n_D^{20}$$

of 1.431, were recovered.

Other modes of applying the principle of the invention may be employed instead of those explained, change being made as regards the details as hereinbefore disclosed, provided the methods or products stated by any of the following claims or the equivalent of such stated methods or products be employed.

We claim:

1. The method which comprises reacting a vinylidene dihalide with a metal alcoholate of a monohydric alcohol.

2. The method which comprises reacting a vinylidene dihalide with a metal alcoholate of a monohydric alcohol at a temperature between about 20° C. and about 175° C.

3. The method which comprises reacting a vinylidene dihalide with a metal alcoholate of a monohydric alcohol at a temperature between about 20° C. and 70° C.

4. The method which comprises reacting a vinylidene dihalide with a metal alcoholate of a monohydric alcohol at a temperature between about 75° C. and about 175° C.

5. The method which comprises reacting vinylidene dichloride with a metal alcoholate of a monohydric alcohol at a temperature between about 20° C. and about 175° C.

6. The method which comprises reacting vinylidene dichloride with a metal alcoholate of an alcohol selected from the class consisting of aliphatic monohydric primary and secondary alcohols.

7. The method which comprises forming a reaction mixture in which the reactants consist of a vinylidene dihalide and a metal alcoholate of a monohydric alcohol, and maintaining said mixture at a temperature between about 20° C. and 175° C. for between 0.2 and 10.0 hours.

8. The method which comprises forming a reaction mixture in which the reactants consist of a vinylidene dihalide, a monohydric alcohol, and a basic compound of a metal, and maintaining said mixture at a temperature between about 20° C. and 175° C. until reaction of the vinylidene dihalide is substantially complete.

9. The method which comprises forming a reaction mixture in which the reactants consist of a vinylidene dihalide, a monohydric alcohol, and a basic compound of a metal, and maintaining said mixture at a temperature between about 20° C. and 70° C. until reaction of the vinylidene dihalide is substantially complete.

10. The method which comprises forming a reaction mixture in which the reactants consist of a vinylidene dihalide, a monohydric alcohol, and a basic compound of a metal, and heating said mixture at a temperature between about 75° C. and 175° C. until reaction of the vinylidene dihalide is substantially complete.

11. The method which comprises forming a reaction mixture in which the reactants consist of vinylidene dichloride, an alcohol selected from the class consisting of aliphatic monohydric primary and secondary alcohols, and a basic compound of a metal, and maintaining said mixture at a temperature between about 20° C. and 175° C. until reaction of the vinylidene dihalide is substantially complete.

12. A compound having the general formula: $CH_3-CX(OR)_2$ wherein X is a halogen and OR is the radical obtained by removing hydrogen from the hydroxyl group of a monohydric alcohol.

13. A compound having the general formula: $CH_3-CX(OR')_2$ wherein X is a halogen and OR' is the radical obtained by removing hydrogen from the hydroxyl group of an alcohol selected from the class consisting of aliphatic monohydric primary and secondary alcohols.

14. 1,1-di-n-propoxy ethyl chloride.

15. 1,1-di-n-butoxy ethyl chloride.

16. The method of preparing an ester of acetic acid which comprises causing a vinylidene dihalide to react with a metal alcoholate of a monohydric alcohol at a temperature between about 20° C. and about 70° C., and separating the ester so formed.

17. The method of preparing a halo-acetal having the general formula $CH_3-CX(OR)_2$ wherein X is a halogen and OR is the radical obtained by removing hydrogen from the hydroxyl group of a monohydric alcohol which comprises heating a vinylidene dihalide with a metal alcoholate of a monohydric alcohol at a temperature between about 75° C. and about 175° C. until reaction is substantially complete, and separating the halo-acetal so formed.

GERALD H. COLEMAN.
RALPH M. WILEY.
BARTHOLDT C. HADLER.